US012529470B1

(12) United States Patent
Li

(10) Patent No.: US 12,529,470 B1
(45) Date of Patent: Jan. 20, 2026

(54) PORTABLE AND SPLICED LAMP STAND

(71) Applicant: LINHAI SHUNSHENG DECORATIVE LIGHTING CO., LTD, Taizhou (CN)

(72) Inventor: Hua Li, Huaihua (CN)

(73) Assignee: LINHAI SHUNSHENG DECORATIVE LIGHTING CO., LTD, Taizhou (CN)

( * ) Notice: Subject to any disclaimer, the term of this patent is extended or adjusted under 35 U.S.C. 154(b) by 0 days.

(21) Appl. No.: 19/033,405

(22) Filed: Jan. 21, 2025

(51) Int. Cl.

| | |
|---|---|
| ***F21V 21/06*** | (2006.01) |
| ***F16M 11/24*** | (2006.01) |
| ***F21S 4/10*** | (2016.01) |
| ***F21V 17/00*** | (2006.01) |
| ***F21V 21/12*** | (2006.01) |
| ***F21W 121/04*** | (2006.01) |

(52) U.S. Cl.
CPC ............ *F21V 21/06* (2013.01); *F16M 11/24* (2013.01); *F21S 4/10* (2016.01); *F21V 17/007* (2013.01); *F21V 21/12* (2013.01); *F21W 2121/04* (2013.01)

(58) Field of Classification Search
CPC ........ F21V 21/06; F21V 21/12; F21V 17/007; F16M 11/24; F16M 11/242; F21S 4/15; F21S 4/10; F21W 2121/04
See application file for complete search history.

(56) References Cited

U.S. PATENT DOCUMENTS

| | | | | | |
|---|---|---|---|---|---|
| 51,910 | A * | 1/1866 | Barbarpour | F16L 25/08 | 285/404 |
| 617,536 | A * | 1/1899 | Martin | B62K 19/16 | 280/281.1 |
| 4,620,270 | A * | 10/1986 | Laakso | F21S 4/10 | 362/419 |
| 4,979,085 | A * | 12/1990 | Voorhees | F21S 4/10 | 211/196 |
| 5,094,893 | A * | 3/1992 | Snider | A47G 33/06 | 211/205 |
| 5,407,292 | A * | 4/1995 | Collins | E21B 17/046 | 403/339 |
| 5,934,628 | A * | 8/1999 | Bosnakovic | F21V 21/06 | 248/169 |
| 6,273,584 | B1 * | 8/2001 | Wang | F21S 6/001 | 362/431 |
| 6,334,694 | B1 * | 1/2002 | Huang | F21S 4/10 | 362/123 |

(Continued)

*Primary Examiner* — Zheng Song
*Assistant Examiner* — James M Endo
(74) *Attorney, Agent, or Firm* — Birchwood IP

(57) ABSTRACT

A portable and spliced lamp stand is provided, a chassis is detachably connected to a bottom lamp rod through a support mechanism. An upper of the bottom lamp rod is detachably sleeved with a middle lamp rod, an upper end of the middle lamp rod is detachably sleeved with a top lamp rod; outer diameters of the bottom lamp rod, middle lamp rod, and top lamp rod are equal; the chassis includes three arc-shaped tubes that are sequentially connected. Two ends of the arc-shaped tubes are respectively provided with an integral connection block, a middle of the connection block is provided with a screw hole. At least two hooks are provided on the arc-shaped tubes. During the use of the lamp stand, a user can assemble and adjust the lamp stand according to needs, and a subsequent disassembly is simple and convenient for storage.

3 Claims, 11 Drawing Sheets

(56) References Cited

U.S. PATENT DOCUMENTS

| | | | | |
|---|---|---|---|---|
| 6,769,796 | B1 * | 8/2004 | Trammell | B44C 5/00 362/450 |
| 7,563,000 | B2 * | 7/2009 | Gierveld | G09F 17/00 362/431 |
| 8,678,615 | B1 * | 3/2014 | Ko | F21S 4/10 362/403 |
| 11,828,444 | B1 * | 11/2023 | Altman | F21V 21/12 |
| 2005/0260360 | A1 * | 11/2005 | Rahman | A47G 33/06 428/18 |
| 2012/0092881 | A1 * | 4/2012 | Ohai | F21V 17/06 362/433 |
| 2014/0037399 | A1 * | 2/2014 | Hyatt | F16B 43/009 470/42 |
| 2024/0374065 | A1 * | 11/2024 | Stout | A47G 33/06 |

* cited by examiner

PORTABLE AND SPLICED LAMP STAND

TECHNICAL FIELD

The present disclosure relates to the field of lamp stand technologies, and in particular, to a portable and spliced lamp stand.

BACKGROUND

As an important component of lighting fixtures, the lamp stand not only supports the lighting fixtures, but also affects a final three-dimensional decorative effect of the lighting fixtures. In existing technology, not only does it occupy a large amount of warehouse space, but it also increases logistics costs and causes serious waste during transportation. Some of the spliced lamp stands in the existing technology are usually structurally complex, difficult for consumers to assemble after purchasing, and have high manufacturing costs for producers. Or the lamp stands are difficult to adjust a splicing angle and are prone to be crushed or cut off when adjusting the splicing angle, rendering it difficult to meet the requirements of consumers.

SUMMARY

The purpose of the present disclosure is to provide a portable and spliced lamp stand that effectively solves technical problems existing in the background technology mentioned above.

To achieve the above objectives, the present disclosure provides the following technical solutions.

A portable spliced lamp stand, including a chassis, a bottom lamp rod, a middle lamp rod, a top lamp rod, and a support mechanism; the chassis is detachably connected to the bottom lamp rod through the support mechanism; an upper end of the bottom lamp rod is detachably sleeved with the middle lamp rod, an upper end of the middle lamp rod is detachably sleeved with the top lamp rod; outer diameters of the bottom lamp rod, the middle lamp rod, and the top lamp rod are equal; the chassis includes three arc-shaped tubes that are sequentially spliced and fixed at a head end and a tail end; two ends of the arc-shaped tubes are respectively provided with an integral connection block, a middle of the connection block is provided with a screw hole; at least two hooks are provided on the arc-shaped tubes.

In some embodiments of the present disclosure, the support mechanism includes an upper support rod and a lower support rod; six first mounting rings are uniformly and fixedly provided on the chassis, three second mounting rings and three third mounting rings are fixedly provided at an upper and a lower of the bottom lamp rod, the three second mounting rings and the three third mounting rings are staggered and fixedly arranged; the second mounting rings are detachably connected to an upper end of the upper support rod through a connection bolt and a nut, a lower of the upper support rod is detachably connected to the first mounting rings through the connection bolt and the nut; upper ends of the third mounting rings are detachably connected to an upper end of the lower support rod through the connection bolt and the nut, a lower end of the lower support rod is detachably connected to the first mounting rings through the connection bolt and the nut; the upper support rod and the lower support rod are staggered in a vertical direction.

In some embodiments of the present disclosure, the upper end of the bottom lamp rod is provided with an integrated first insertion rod, and the first insertion rod is provided with a first insertion hole; a lower end of the middle lamp rod is provided with a first bolt hole, and the first bolt hole is opposite to the first insertion hole and adjusting and tightening the bottom lamp rod and the middle lamp rod by a first adjusting bolt; the upper end of the middle lamp rod is provided with an integrated second insertion rod, and the second insertion rod is provided with a second insertion hole; a lower end of the top lamp rod is provided with a second bolt hole, and the second bolt hole is opposite to the second insertion hole and adjusting and tightening the middle lamp rod and the top lamp rod by a second adjusting bolt.

In some embodiments of the present disclosure, the first bolt hole and the second bolt hole have same sizes; the first adjusting bolt and the second adjusting bolt have same specifications.

In some embodiments of the present disclosure, a fixing ring is provided on the top lamp rod, two crossbars are integrally welded on an inner side of the fixing ring, and the crossbars are fixedly welded to an outer wall of the top lamp rod.

In some embodiments of the present disclosure, a thickness of the connection block is a half of thicknesses of the arc-shaped tubes, the connection block between adjacent arc-shaped tubes is fixedly connected in a screw hole through the connection bolt and the nut, and assembled the chassis into a circular structure.

In some embodiments of the present disclosure, the connection block is a serrated structure, the connection block between adjacent arc-shaped tubes is fixedly connected in a screw hole through the connection bolt and the nut, and assembled the chassis into a circular structure.

Compared with the existing technology, the present disclosure has the following beneficial effects as following.

The chassis is detachably and fixedly connected to the bottom lamp rod through the support mechanism. The upper end of the bottom lamp rod is detachably sleeved with the middle lamp rod, the upper end of the middle lamp rod is detachably sleeved with the top lamp rod. The outer diameters of the bottom lamp rod, the middle lamp rod, and the top lamp rod are equal. The chassis includes three arc-shaped tubes that are sequentially connected and fixed at the beginning and end. Two ends of the arc-shaped tubes are respectively provided with an integral connection block, and the middle of the connection block is provided with a screw hole. At least two hooks are uniformly provided on the arc-shaped tubes. The present disclosure has a simple structure, and a user can assemble and adjust an angle of the lamp stand according to his own needs without breaking a subsequent installed lamp string circuit. The entire lamp stand is easy to disassemble, rendering it convenient for the user to store and carry. After assembly, the lamp stand has strong overall stability and is easy to move, and can be used indoors and outdoors, thereby adapting to different scene needs and improving the user's experience.

DESCRIPTION OF EMBODIMENTS

The present disclosure will be further explained in combination with the accompanying drawings and specific embodiments.

Figure 1:
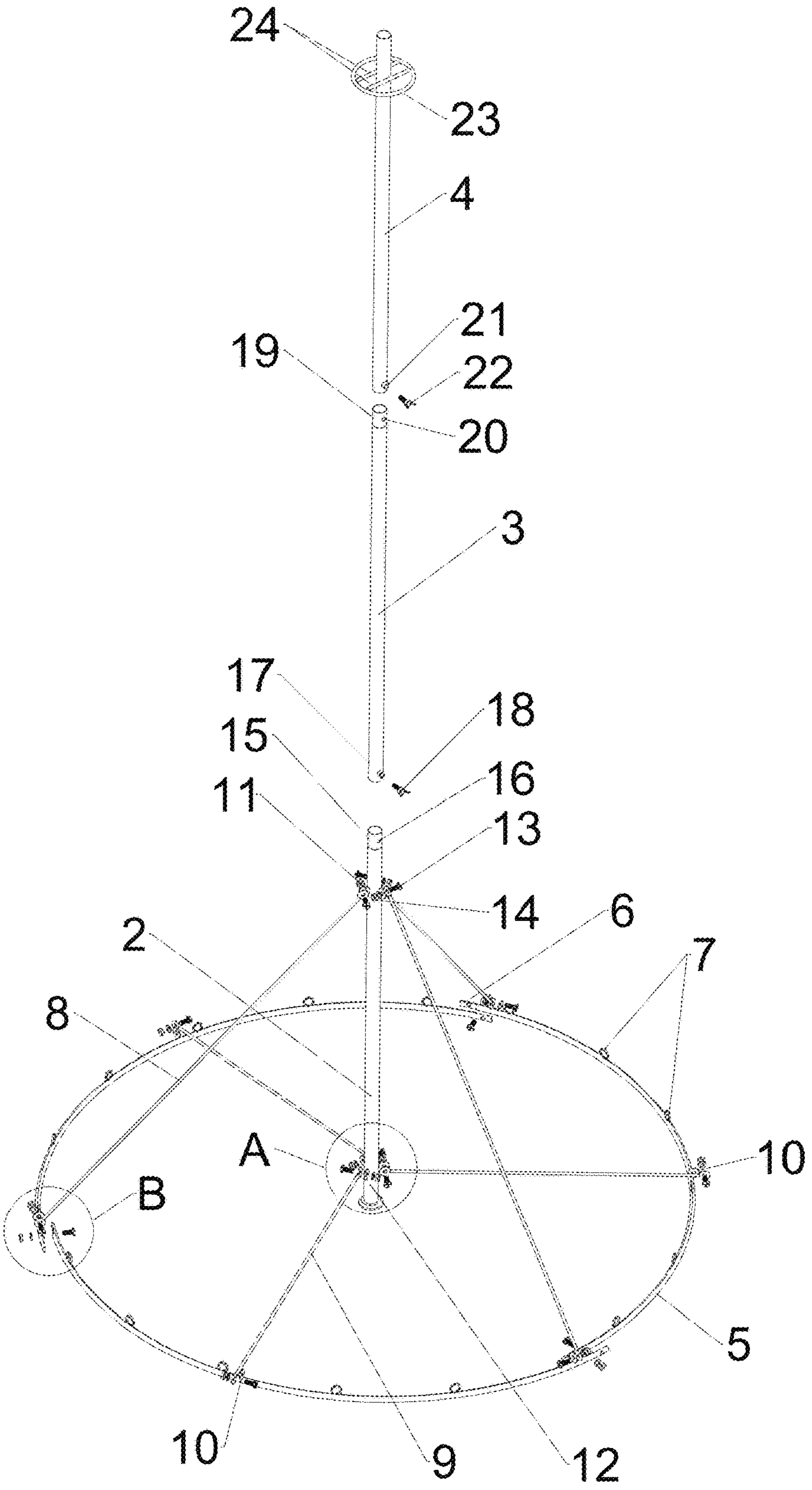
FIG. 1 is an exploded view of a first embodiment of the present disclosure.
Figure 2:
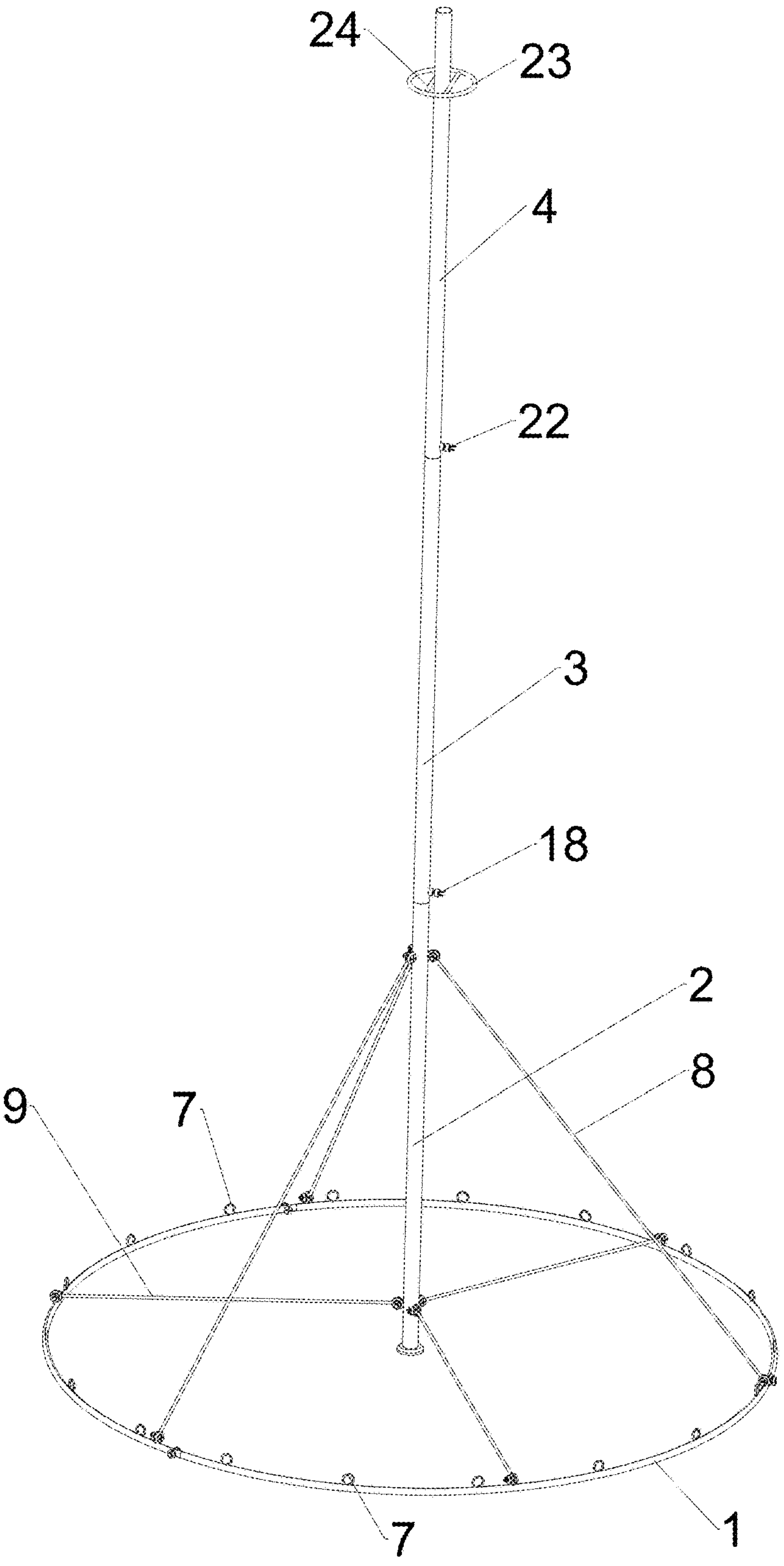
FIG. 2 is a schematic structural diagram of the first embodiment of the present disclosure.
Figure 3:
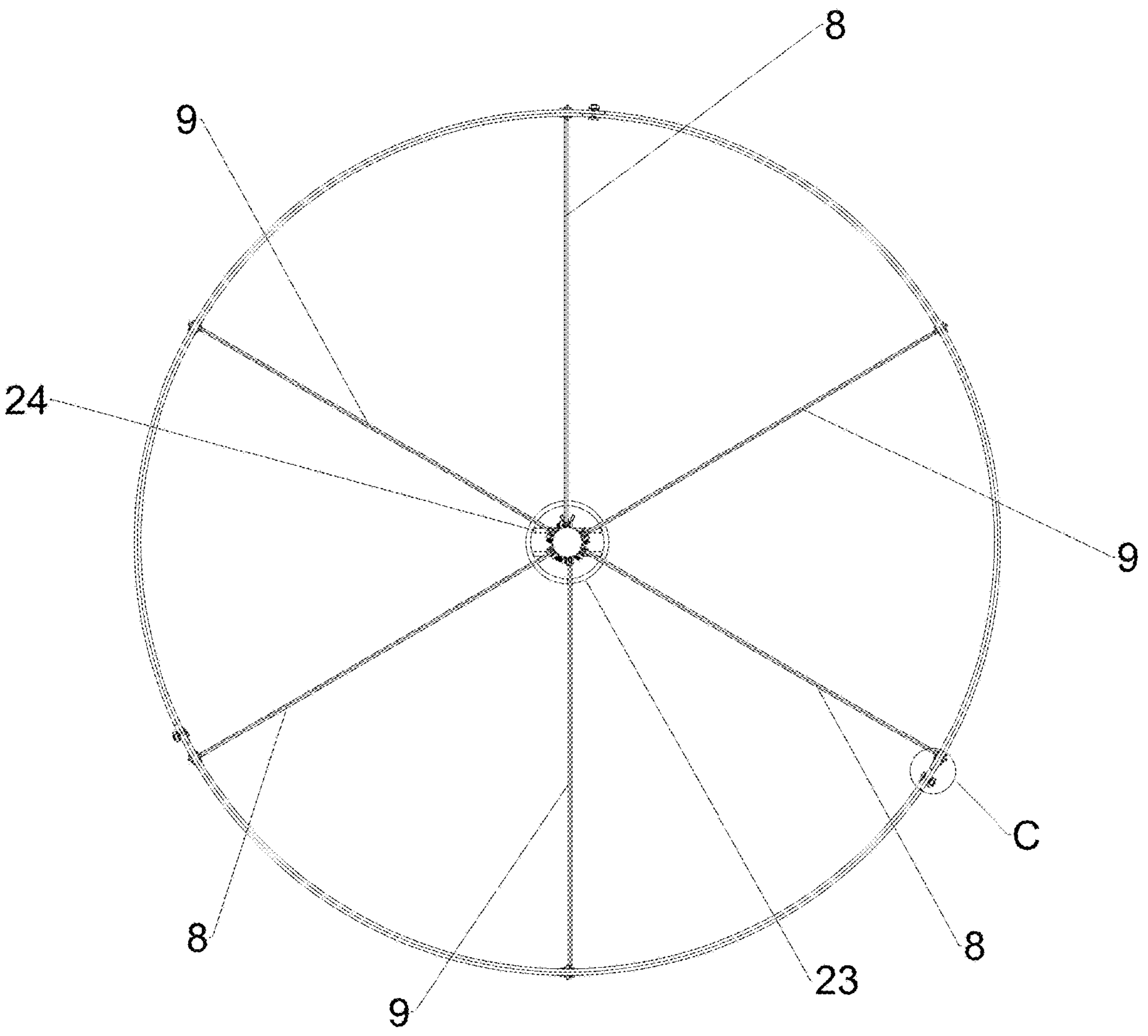
FIG. 3 is a top view of the first embodiment of the present disclosure.
Figure 4:
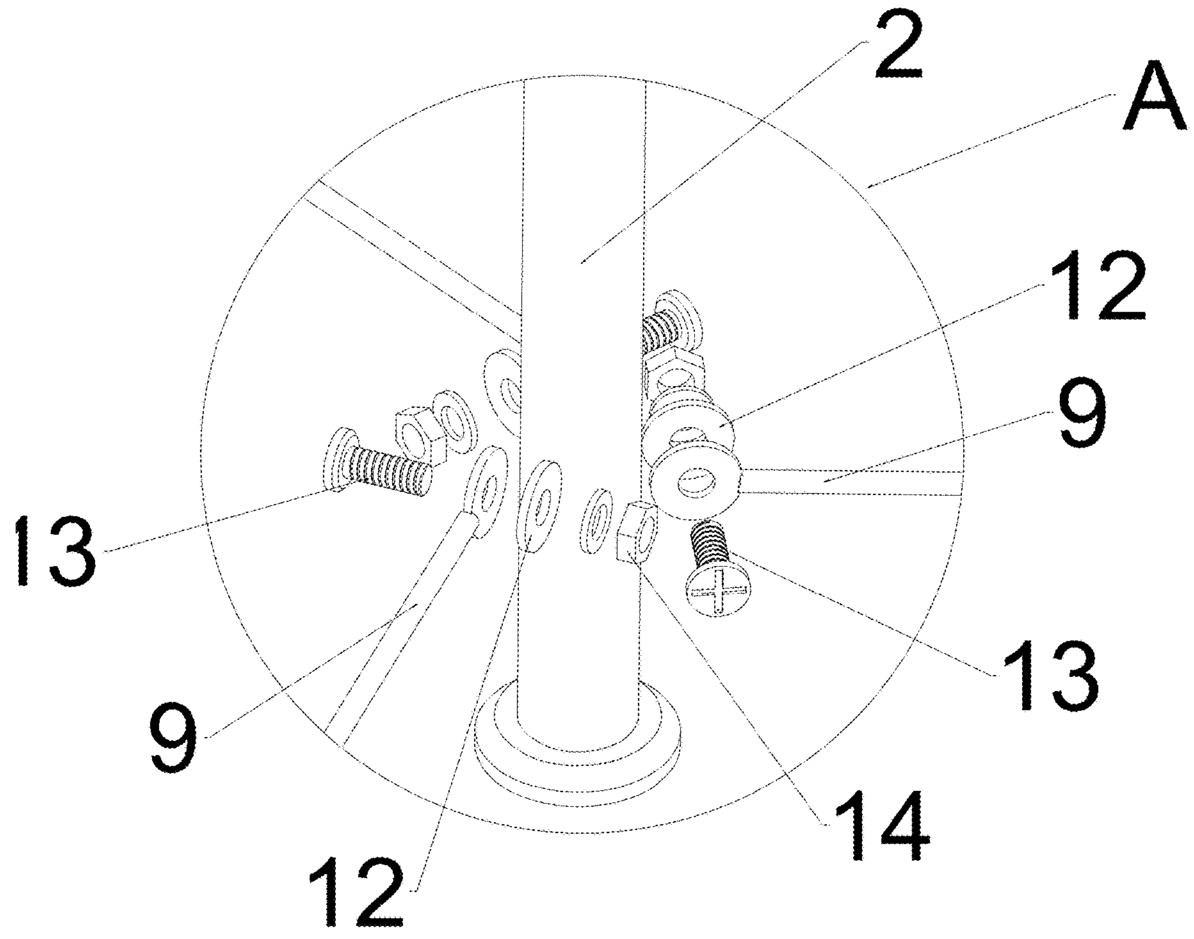
FIG. 4 is an enlarged view of point Ain FIG. 1 of the present disclosure.
Figure 5:
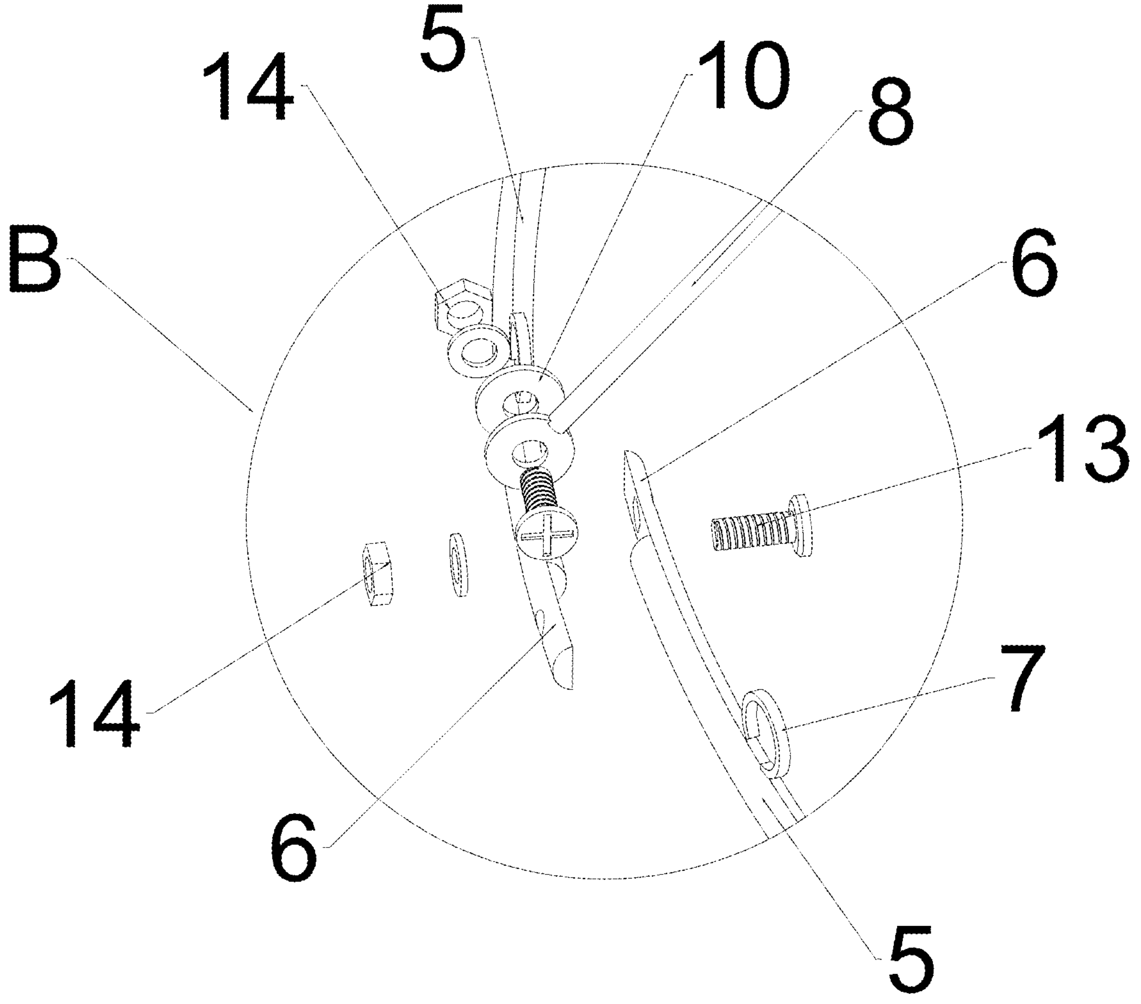
FIG. 5 is an enlarged view of point B in FIG. 1 of the present disclosure.
Figure 6:
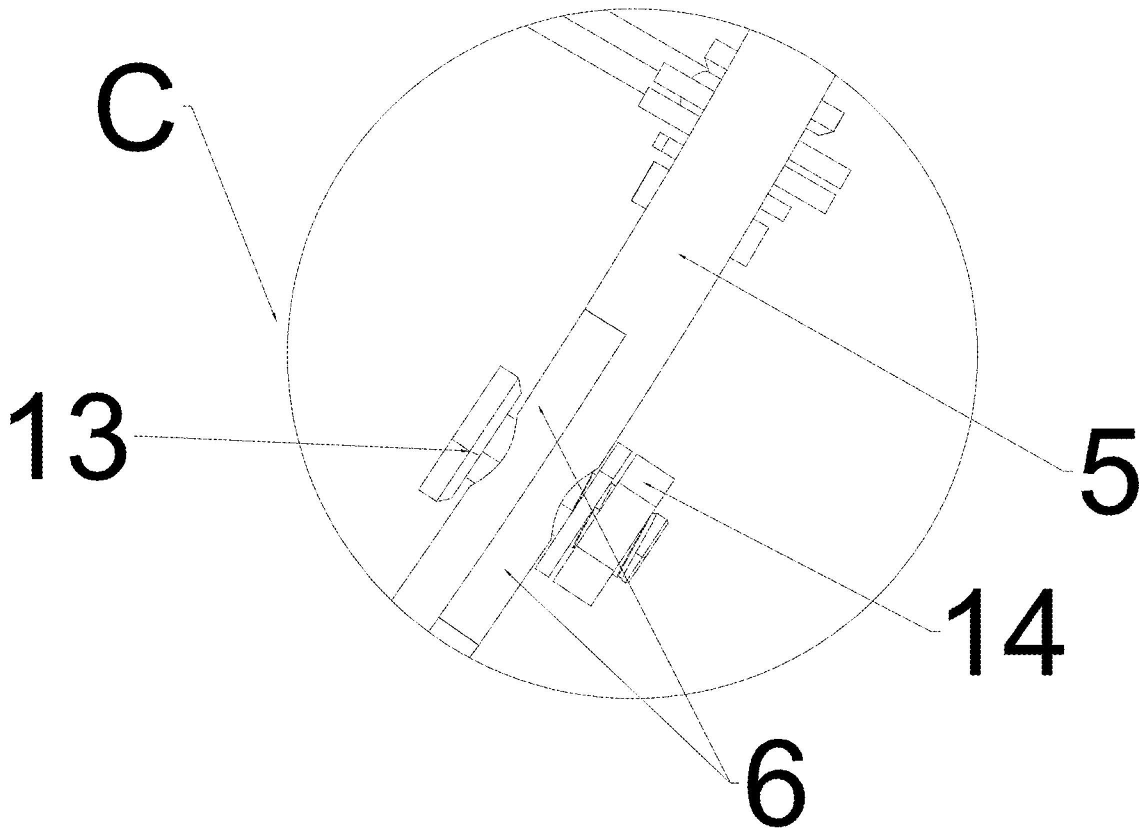
FIG. 6 is an enlarged view of point C in FIG. 3 of the present disclosure.
Figure 7:
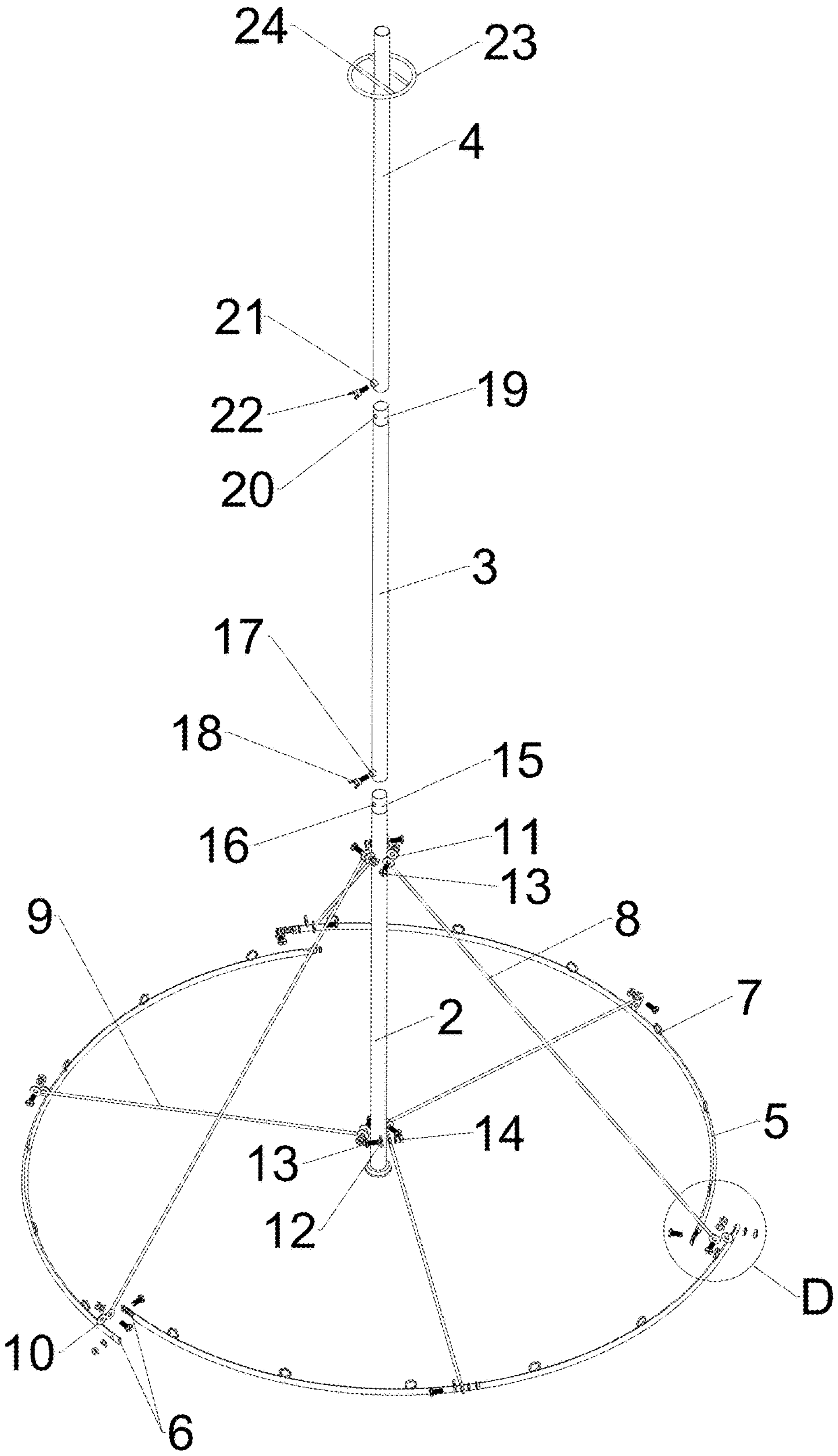
FIG. 7 is an exploded view of a second embodiment of the present disclosure.
Figure 8:
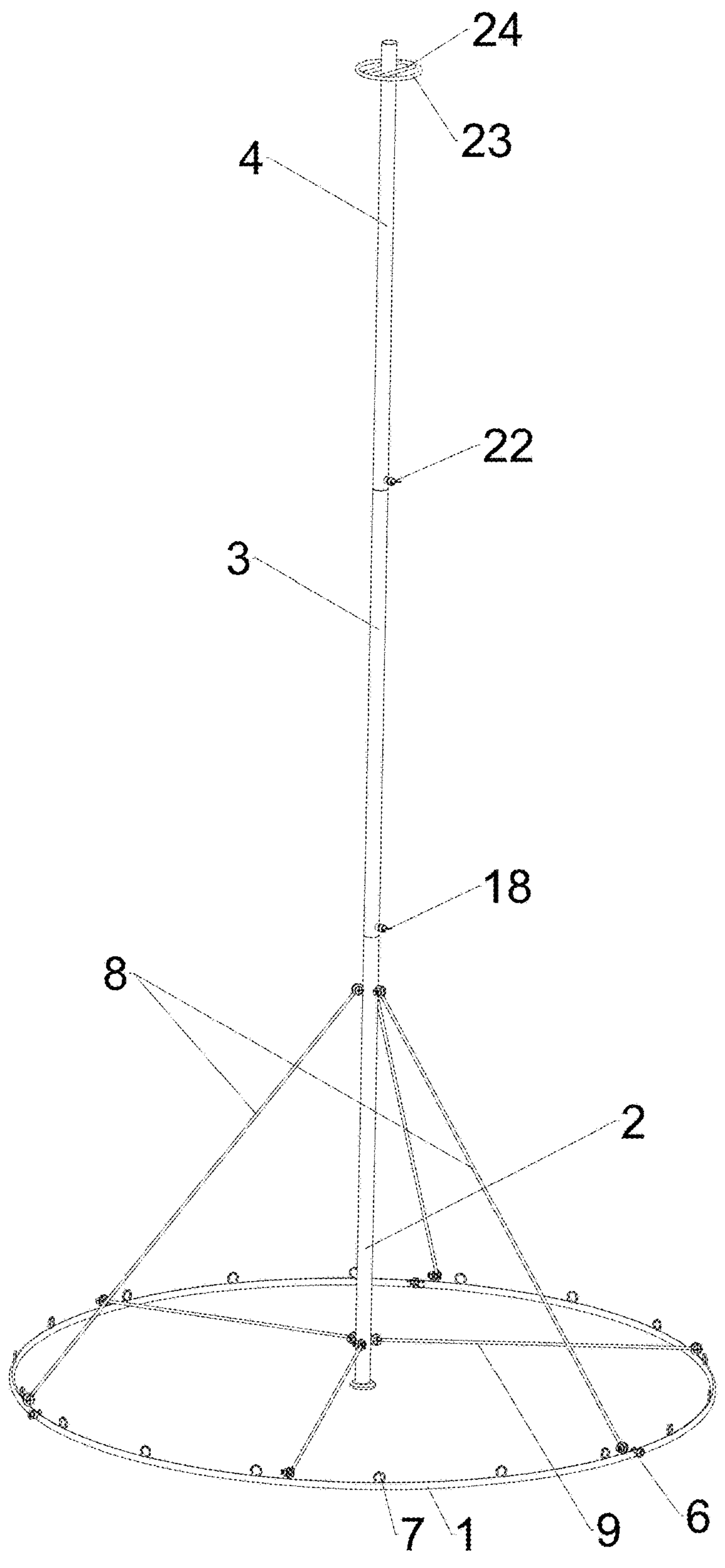
FIG. 8 is a schematic structural diagram of the second embodiment of the present disclosure.
Figure 9:
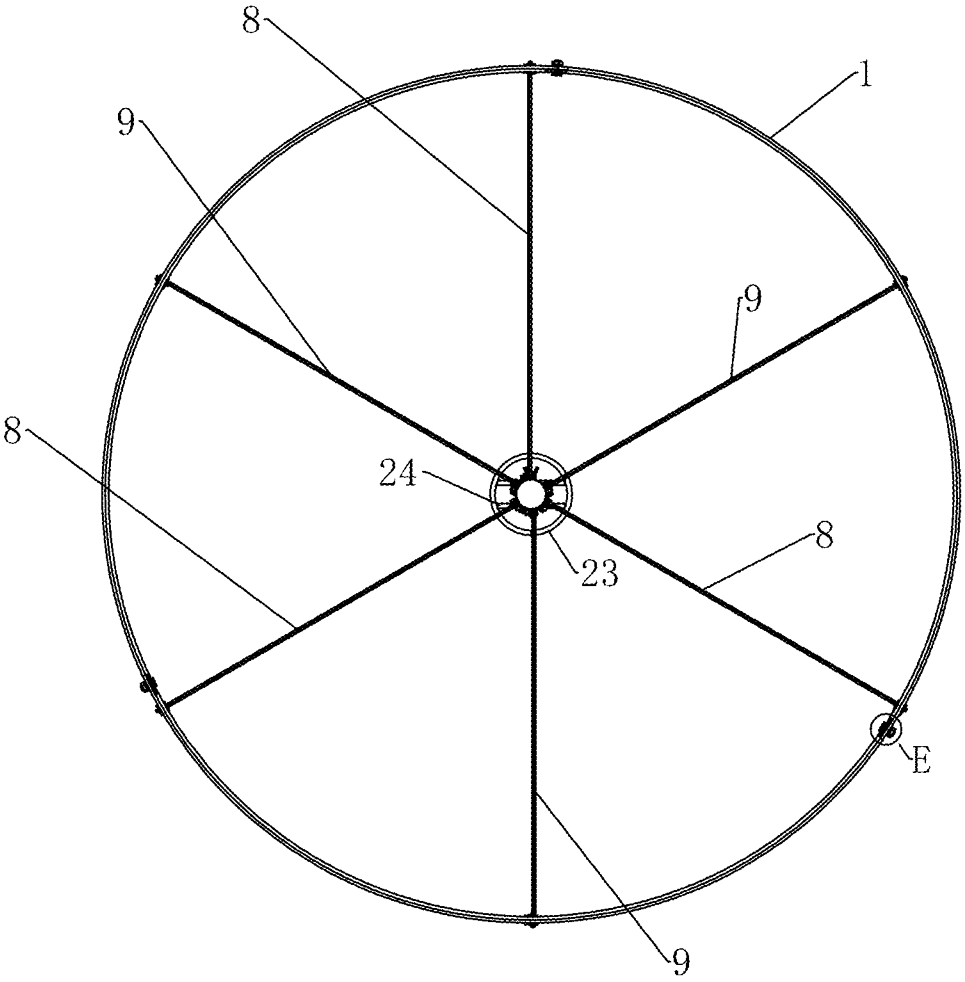
FIG. 9 is a top view of the second embodiment of the present disclosure.
Figure 10:
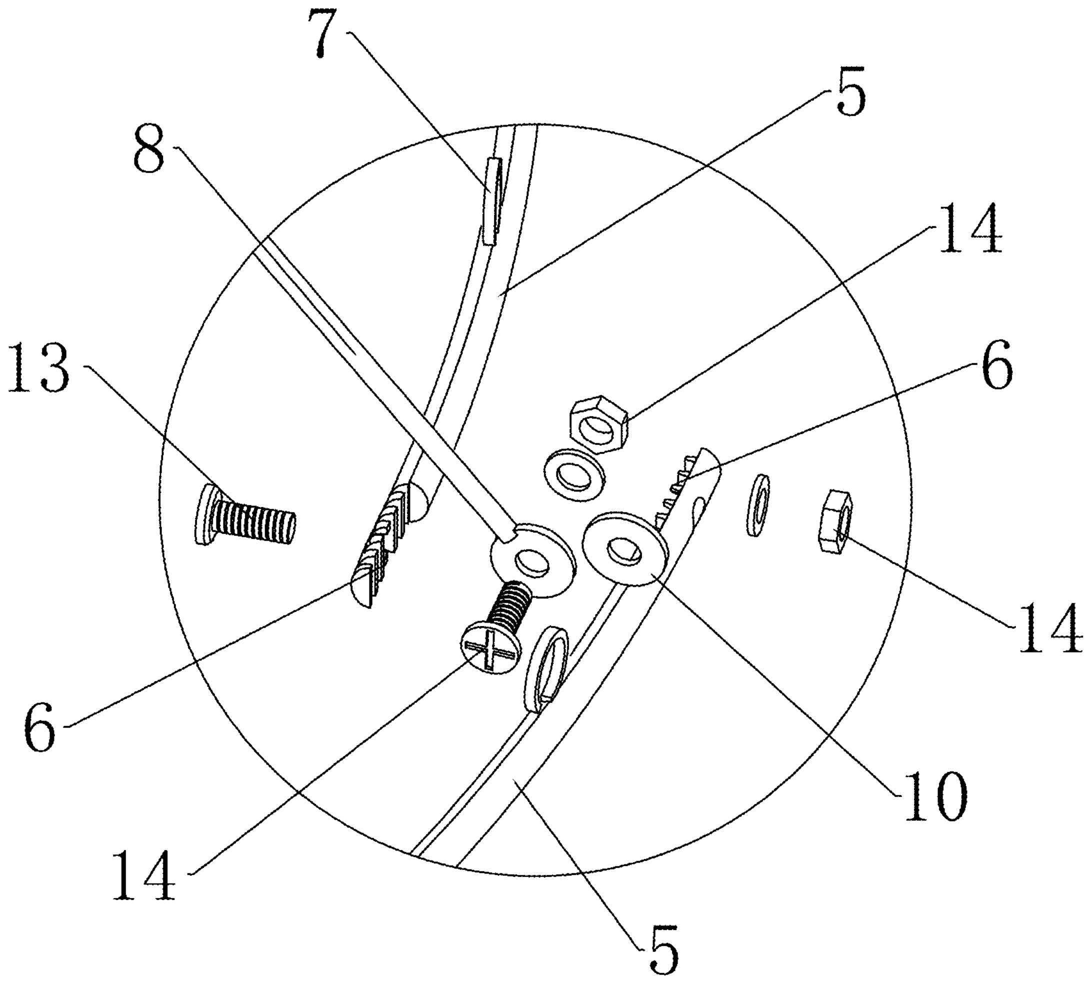
FIG. 10 is an enlarged view of point D in FIG. 7 of the present disclosure.
Figure 11:
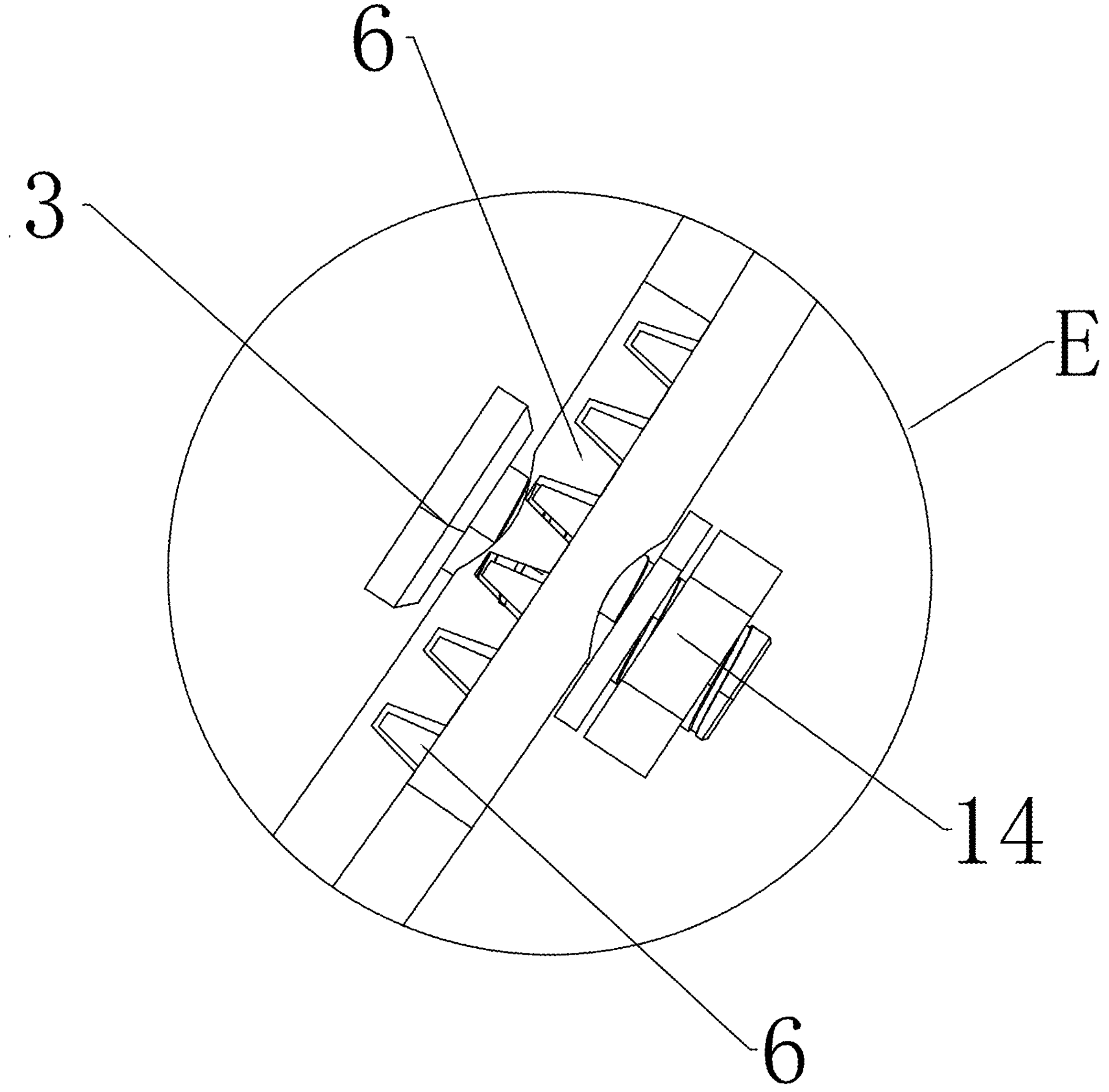
FIG. 11 is an enlarged view of point E in FIG. 9 of the present disclosure.

As shown in FIGS. 1 to 11, the present disclosure provides a portable and spliced lamp stand, including a chassis 1, a bottom lamp rod 2, a middle lamp rod 3, a top lamp rod 4, an arc-shaped tube 5, a connection block 6, a hook 7, an upper support rod 8, a lower support rod 9, a first mounting ring 10, a second mounting ring 11, a third mounting ring 12, a connection bolt 13, a nut 14, a first insertion rod 15, a first insertion hole 16, a first bolt hole 17, a first adjusting bolt 18, a second insertion rod 19, a second insertion hole 20, a second bolt hole 21, a second adjusting bolt 22, a fixing ring 23, and a crossbar 24.

In a description of the present disclosure, unless otherwise specified, "a plurality of" means two or more; terms "up", "down", "left", "right", "inside", "outside", "front end", "back end", "head end", "tail end", etc. indicate an orientation or positional relationship based on the orientation or positional relationships shown in the accompanying drawings, only for a convenience of describing the present disclosure and simplifying the description, and do not indicate or imply that the device or element referred to must have a specific orientation, be constructed and operated in a specific orientation, and therefore cannot be understood as limiting the present disclosure. In addition, terms "first", "second", "third", etc. are only used for descriptive purposes and cannot be understood as indicating or implying relative importance.

As shown in FIGS. 1 to 6, the chassis 1 is detachably and fixedly connected to the bottom lamp rod 2 through the support mechanism. An upper end of the bottom lamp rod 2 can be detachably sleeved with the middle lamp rod 3; an upper end of the middle lamp rod 3 can be detachably sleeved with the top lamp rod 4. Outer diameters of the bottom lamp rod 2, the middle lamp rod 3, and the top lamp rod 4 are equal, and there is at least one middle lamp rod 3. If a user needs to build a higher lamp stand, a plurality of middle lamp rods 3 can be sequentially fitted. The attached figure of this embodiment takes one middle lamp rod 3 as an example.

The chassis 1 includes three arc-shaped tubes 5 that are sequentially spliced and fixed at a beginning and an end. Two ends of the arc-shaped tubes 5 are respectively provided with an integrated connection block 6. A middle of the connection block 6 is provided with a screw hole. In an implementation mode, a thickness of the connection block 6 is a half of thicknesses of the arc-shaped tubes 5, so that an entire edge of the chassis 1 is continuous and has no protruding structure after assembly, thereby improving an overall appearance of the lamp stand. The connection block 6 between adjacent arc-shaped tubes 5 is fixedly connected in a screw hole through the connection bolt 13 and the nut 14, and the chassis 1 is assembled into a circular structure.

This embodiment and its accompanying drawings take three arc-shaped tubes 5 as an example, which can also be four or six. When the user needs a chassis 1 with a relatively large diameter, he can choose to customize the chassis 1 to have four or six arc-shaped tubes 5 that are spliced together to form a circular structure.

At least two hooks 7 are evenly provided on the arc-shaped tube 5. Taking six hooks as an example in this figure, the hooks 7 are used to hang a lower end of a light string, rendering an arrangement of the light string on the lamp stand uniform and beautiful.

The supporting mechanism includes the upper support rod 8 and the lower support rod 9. Six first mounting rings 10 are uniformly and fixedly provided on the chassis 1. An upper end and a lower end of the bottom lamp rod 2 are fixedly provided with three second mounting rings 11 and three third mounting rings 12, the three second mounting rings 11 and the three third mounting rings 12 are staggered and fixedly arranged. The second mounting rings 11 are detachably and fixedly connected to an upper end of the upper support rod 8 through the connection bolt 13 and the nut 14, and a lower end of the upper support rod 8 is detachably and fixedly connected to the first mounting rings 10 through the connection bolt 13 and the nuts 14. Upper ends of the third mounting rings 12 are detachably and fixedly connected to an upper end of the lower support rod 9 through the connection bolt 13 and the nut 14, and a lower end of the lower support rod 9 is detachably and fixedly connected to the first mounting rings 10 through the connection bolt 13 and the nut 14. The upper support rod 8 and the lower support rod 9 are evenly staggered in a vertical direction to improve the stability of an assembled lamp stand.

The upper end of the bottom lamp rod 2 is provided with an integrated first insertion rod 15, and the first insertion rod 15 is provided with a first insertion hole 16. A lower end of the middle lamp rod 3 is provided with the first bolt hole 17, and the first bolt hole 17 is opposite to the first insertion hole 16 and adjusting and tightening the bottom lamp rod 2 and the middle lamp rod 3 by the first adjusting bolt 18. The upper end of the middle lamp rod 3 is provided with an integrated second insertion rod 19, and the second insertion rod 19 is provided with a second insertion hole 20. A lower end of the top lamp rod 4 is provided with the second bolt hole 21, and the second bolt hole 21 is opposite to the second insertion hole 20 and adjusting and tightening the middle lamp rod 3 and the top lamp rod 4 by the second adjusting bolt 22.

The first bolt hole 17 and the second bolt hole 21 have same sizes. The first adjusting bolt 18 and the second adjusting bolt 22 have same specifications; thereby facilitating the user to replace the first adjusting bolt 18 and the second adjusting bolt 22 in the future.

The top lamp rod 4 is provided with the fixing ring 23, and two crossbars 24 are welded together on an inner side of the fixing ring 23. The crossbars 24 are fixedly welded to an outer wall of the top lamp rod 4. The fixing ring 23 is configured to facilitate the user to put the light string on the fixing ring 23 in the future, thereby forming a fulcrum.

It should be explained that the connection bolt 13 and the nut 14 used at different positions in this embodiment are of the same model and size, and are all commonly available connection bolt 13 and the nut 14 on the market. Therefore, the attached figure does not distinguish and mark the connection bolt 13 and the nut 14 at different positions to facilitate the user to replace them during use.

As shown in FIGS. 7 to 11, the connection block 6 has a serrated structure, and the connection block 6 between adjacent arc-shaped tubes 5 is fixedly connected in a screw hole through the connection bolt 13 and the nut 14. The chassis 1 is assembled into a circular structure, and the edges of the chassis 1 can also be continuous without protrusion.

The present disclosure has a simple structure, and the user can assemble and adjust an angle of the lamp stand according to his own needs without breaking a subsequent installed lamp string circuit. The entire lamp stand is easy to disassemble, rendering it convenient for the user to store and carry. After assembly, the lamp stand has strong overall stability and is easy to move, and can be used indoors and outdoors, thereby adapting to different scene needs and improving the user's experience.

The above embodiments are only preferred embodiments of the present disclosure and cannot be used to limit the scope of the present disclosure. Therefore, modifications, equivalent changes, improvements, etc. made within the scope of the present disclosure still fall within the scope of the present disclosure.

What is claimed is:

1. A portable and spliced lamp stand, comprising: a chassis, a bottom lamp rod, a middle lamp rod, a top lamp rod, and a support mechanism;

the chassis is detachably connected to the bottom lamp rod through the support mechanism;

an upper end of the bottom lamp rod is detachably sleeved with the middle lamp rod, an upper end of the middle lamp rod is detachably sleeved with the top lamp rod;

outer diameters of the bottom lamp rod, the middle lamp rod, and the top lamp rod are equal to each other;

the chassis comprises three arc-shaped tubes that are sequentially spliced and fixed at a head end and a tail end;

two ends of the arc-shaped tubes are respectively provided with an integral connection block, a middle of the connection block is provided with a screw hole;

at least two hooks are provided on the arc-shaped tubes;

a lower end of the middle lamp rod is provided with a first bolt hole, and the first bolt hole is opposite to a first insertion hole and adjusting and tightening the bottom lamp rod and the middle lamp rod by a first adjusting bolt;

a lower end of the top lamp rod is provided with a second bolt hole, and the second bolt hole is opposite to a second insertion hole and adjusting and tightening the middle lamp rod and the top lamp rod by a second adjusting bolt;

wherein the first bolt hole and the second bolt hole have same sizes; the first adjusting bolt and the second adjusting bolt have same specifications;

a fixing ring is provided on the top lamp rod, two crossbars are integrally welded on an inner side of the fixing ring, and the crossbars are fixedly welded to an outer wall of the top lamp rod;

wherein the connection block is a serrated structure;

wherein the connection block between adjacent arc-shaped tubes is fixedly connected in a screw hole through the connection bolt and the nut, and the chassis is assembled into a circular structure.

2. The portable and spliced lamp stand according to claim 1, wherein the support mechanism comprises an upper support rod and a lower support rod;

six first mounting rings are uniformly and fixedly provided on the chassis, three second mounting rings and three third mounting rings are fixedly provided at an upper and a lower of the bottom lamp rod, the three second mounting rings and the three third mounting rings are staggered and fixedly arranged;

the second mounting rings are detachably connected to an upper end of the upper support rod through a first connection bolt and a first nut, a lower end of the upper support rod is detachably connected to the first mounting rings through a second connection bolt and a second nut;

upper ends of the third mounting rings are detachably connected to an upper end of the lower support rod through a third connection bolt and a third nut, a lower end of the lower support rod is detachably connected to the first mounting rings through the connection bolt and the nut;

the upper support rod and the lower support rod are staggered in a vertical direction.

3. The portable and spliced lamp stand according to claim 2, wherein the upper end of the bottom lamp rod is provided with an integrated first insertion rod, and the first insertion rod is provided with the first insertion hole;

the upper end of the middle lamp rod is provided with an integrated second insertion rod, and the second insertion rod is provided with the second insertion hole.

* * * * *